United States Patent
Frazier et al.

(10) Patent No.: US 11,858,840 B1
(45) Date of Patent: Jan. 2, 2024

(54) METHOD AND APPARATUS FOR TREATMENT OF AN ANIMAL PROCESSING WASTEWATER STREAM

(71) Applicant: JP STILTSKIN, LLC, Colorado Springs, CO (US)

(72) Inventors: Scott Frazier, Frisco, TX (US); Jon Khachaturian, New Orleans, LA (US)

(73) Assignee: JP STILTSKIN, LLC, Colorado Springs, CO (US)

( * ) Notice: Subject to any disclaimer, the term of this patent is extended or adjusted under 35 U.S.C. 154(b) by 88 days.

(21) Appl. No.: 16/924,751

(22) Filed: Jul. 9, 2020

Related U.S. Application Data

(60) Provisional application No. 62/872,162, filed on Jul. 9, 2019.

(51) Int. Cl.
| | | |
|---|---|---|
| *C02F 9/00* | (2023.01) | |
| *C02F 1/66* | (2023.01) | |
| *C02F 103/22* | (2006.01) | |
| *C02F 1/24* | (2023.01) | |
| *C02F 1/68* | (2023.01) | |
| *C02F 1/56* | (2023.01) | |

(52) U.S. Cl.
CPC ............... *C02F 9/00* (2013.01); *C02F 1/24* (2013.01); *C02F 1/56* (2013.01); *C02F 1/66* (2013.01); *C02F 1/68* (2013.01); *C02F 2103/22* (2013.01)

(58) Field of Classification Search
CPC ........................................................ C02F 9/00
See application file for complete search history.

(56) References Cited

U.S. PATENT DOCUMENTS

| | | | | |
|---|---|---|---|---|
| 2006/0011550 A1* | 1/2006 | Bourke | ............... | B01J 41/04 210/681 |
| 2011/0000854 A1* | 1/2011 | Nichols | ............... | C02F 1/288 210/666 |
| 2015/0108067 A1* | 4/2015 | Calhoun | ............... | C02F 3/121 210/150 |
| 2017/0001879 A1* | 1/2017 | Roa-Espinosa | ............... | C02F 9/00 |

* cited by examiner

*Primary Examiner* — Peter Keyworth
(74) *Attorney, Agent, or Firm* — Procopio, Cory, Hargreaves & Savitch LLP

(57) ABSTRACT

The present invention relates to the treatment of a wastewater stream that is generated from animal processing such as the processing of chicken, beef or pork. More particularly, the present invention relates to the separation of usable protein from an animal processing wastewater stream using a density modifier and a modification of the protein phase density to enhance lipid fat phase separation from protein solids.

25 Claims, 3 Drawing Sheets

METHOD AND APPARATUS FOR TREATMENT OF AN ANIMAL PROCESSING WASTEWATER STREAM

CROSS-REFERENCE TO RELATED APPLICATIONS

This is a nonprovisional patent application of U.S. Provisional Patent Application Ser. No. 62/872,162, filed 9 Jul. 2019, which is hereby incorporated herein by reference.

Priority of U.S. Provisional Patent Application Ser. No. 62/872,162, filed 9 Jul. 2019, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the treatment of a wastewater stream that is generated from animal processing such as the processing of chicken, beef or pork. More particularly, the present invention relates to the enhanced separation of waste solids from an animal processing wastewater stream using a rare earth density modifier (lanthanum, cerium, or praseodymium salts) which causes a modification to the protein phase density to enhance lipid fat phase separation from protein solids. A method and apparatus of the present invention results in a reduction in volume of the wastewater solids solution that must otherwise be trucked away from the processing plant and disposed of.

2. General Background of the Invention

Significant solid waste is generated because of the wastewater treatment process in the food processing industry. Animal by-products that are strictly considered waste are processed into a wastewater sludge that must be removed from the plant and disposed of elsewhere. Most of this waste is disposed of by the permitted spread of the sludge over a specified number of acres, or landfilling of the waste solids. This can be both time consuming and costly.

Various methods have been used to concentrate and dewater the material for disposal. A need exists to enhance the separation of the wastewater stream in order to reduce the transportation and spreading costs.

BRIEF SUMMARY OF THE INVENTION

The present invention provides an improved animal processing wastewater stream treatment that minimizes sludge disposal transportation costs and reduces permitted land application acreage. A method and apparatus of the present invention utilizes a rare earth/water mix which is injected into the wastewater stream at the plant, resulting in the reduction of the waste sludge volume by as much as 50% or more.

With an improved method and apparatus of the present invention, density modifiers acting as separation agents can be comprised of rare earth salts of lanthanum, cerium, praseodymium or a combination thereof. The density modifier used as part of the present invention prevents oxidation of the lipid fraction, serving as an antioxidant of the wastewater stream. This has the dual benefit of stabilizing the oxidation rate of the wastewater fraction (which can be important for meeting city wastewater standards), as well as enabling further processing of the solid fraction of the wastewater stream.

The present invention provides an improved method of treating a wastewater stream from an animal processing facility (e.g., poultry, beef or pork). In one embodiment, the wastewater stream is pumped through a first stage chemical injection stage or location, which can be a section of the wastewater piping system (for example, a flocculation unit or floc tube) located just before entering a first dissolved air floatation (DAF) unit. Flocculation units are commercially available (e.g., www.frcesystems.com). Dissolved air flotation units are commercially available (www.frcsystems.com).

First Stage Treatment

The first chemical introduced during the first chemical injection stage is preferably a mineral acid (for example, sulfuric acid ($H_2SO_4$)) or hydrochloric acid or an organic acid (i.e., carbonic, citric or acetic). First stage injection of chemicals can use a first flocculation unit or floc tube. In one embodiment, sulfuric acid can be used to adjust the pH value of the wastewater stream to between about 6 and 9. The pH value can be adjusted to about 4.8-5.2 in another embodiment.

The injection of acid (e.g., sulfuric acid) is preferably followed by the injection of a density modifier (such as a lanthanum chloride water mix, for example, lanthanum chloride crystal or any compound with lanthanum, cerium, or praseodymium salts). Finally two polymers are added, one cationic (for example 504650 manufactured by SNF FLOERGER) and one anionic (for example AN945 manufactured by SNF FLOERGER). The density modifier is preferably injected into the wastewater stream at a rate of between about 10 and 1000 (milligrams per liter). In one embodiment the density modifier is injected at a rate of 80-240 milligrams per liter.

After the first stage treatment chemical injection is completed, the wastewater stream flows into a first dissolved air floatation (DAF1) unit. Dissolved air flotation units are known and commercially available such as model PCL Series manufactured by FRC SYSTEMS International. In its modified state (i.e., after first chemical injection stage treatment), protein floats to the top of the dissolved air flotation unit, separating from the wastewater. The protein can be skimmed into a sludge hopper or other suitable vessel and then pumped or otherwise transmitted to trucks for transport to a suitable disposal locale. Due to this invention and the new density modifier (e.g., lanthanum, which is FDA approved), the skimmed material (dissolved air flotation "float" or "skimmings") includes protein and fat that can be separated and then used to make animal feed.

In one embodiment, the density modifier can be lanthanum, a lanthanum salt, a lanthanum water mix, cerium, praseodymium salt or a combination of one or more of lanthanum, lanthanum salt, lanthanum water mix, cerium, praseodymium salt.

Stage II Treatment

After the protein is skimmed off the top of the first dissolved air flotation unit, the first stage treatment is complete. The now significantly purified wastewater stream is transmitted or pumped into a holding tank with a capacity of between 100,000 and 1,000,000 gallons, for example about 300,000 gallons.

With a wastewater flow rate of, for example, 1,200,000 gallons/day, a 300,000 gallon capacity holding tank allows the wastewater to be held in the holding tank, for example, for between two and five hours.

During this time, the density modifier helps to drive a reaction that increases the alkalinity of the wastewater to a pH of between about 6.0-6.5, which in turn enhances the further purification of the wastewater stream, and reduces the need for additional treatment with a mineral acid, such as sulfuric acid.

From the holding tank (e.g., 300,000 gallon volume), the wastewater is transmitted (e.g., pumped) through the wastewater piping system to the second stage chemical injection location (which could be, for example, a second flocculation unit or floc tube) located just before entering a second dissolved air flotation unit.

The first chemical introduced during the second chemical injection stage treatment could be a mineral acid (for example sulfuric acid or hydrochloric acid). Due to the chemical reaction driven by the density modifier (or combination of modifiers), the need for sulfuric acid ($H_2SO_4$) during this section state is much reduced, and is optional or not required at all.

The injection of the sulfuric acid, if any, is followed by the injection of the density modifier (for example, lanthanum/water mix), and (as in the first stage treatment) by the two polymers, one cationic and one anionic. A flocculation unit can be used.

A rare earth density modifier is injected into the wastewater stream at a rate of between about 10-1000 milligrams/liter in one embodiment, and 80-240 milligrams/liter in another embodiment.

After the second stage chemical injection treatment is completed, the wastewater stream flows into a second dissolved air flotation unit (DAF2). In its newly modified state during stage II treatment protein again floats to the top of the DAF unit (second dissolved air flotation unit), separating from the wastewater, and is skimmed off the top into a sludge hopper or other vessel.

In one embodiment, chemical analyses can be located at the wastewater outflow locations of both dissolved air flotation units (DAF1 and DAF2), allowing detailed chemical analyses of the wastewater at both locations. The DAF units can be obtained from Vanaire, Inc. (www.vanaire.com).

After discharge from the second dissolved air flotation unit, the wastewater stream is now suitable for discharge into, for example, a municipal waterstream, and is well within required regulatory parameters for safety.

The rare earth density modifiers can be lanthanum, cerium, praseodymium or a combination of one or more of these rare earth density modifiers. In one embodiment a mix of water and one or more of these rare earth density modifiers can be used. In one embodiment, an example of 1000-liter batch (2204 lb.) includes 441 lbs. $LaCl_3$ (lanthanum chloride crystals) and 1,763 lbs. city source $H_2O$. $LaCl_3$ equals 45% lanthanum chloride heptahydrate=$Cl_3H_{14}LaO$. $H_2O$ equals potable water such as city source. In another embodiment the city source water can be pretreated with HCL. ORP (oxidation reduction potential) can be used to vary acid content of solution water and for process control to insure consistent quality control. A 10% dilute phase Baume HCL "hydrochloric acid" can be used with ORP tuning in same way. HCL can be used to increase H+ content "cationiticity" and solvent capacity of the makeup water.

An alternate formula makes a 1000-liter batch (2,240 lb.). The alternate formula uses equal amounts of a straight lanthanum blend and aluminum salt (e.g., 1,102 pounds of each). Aluminum salt equals Aluminum Chloride, Aluminum Sulfate, Aluminum Chlorohydrate "ACH" or salts thereof in various commercially available quantities from Gulbrandsen. The aluminum salt product is blended in various concentrations: 20/80; 50/50; and 80/20.

In another embodiment, any combination of the above products combined with high molecular weight organic copolymers in the family of products produced by SNF Floerger to include: Floquat FL 4340, 4420, 4440, 4450, 4520, 4530, 4535, 4540, 4620, 4820 which are products in the cationic PolyDADMAC family produced by SNF and Floquat FL 2250, 2273, 2350, 2550, 2565, 2650, 2850, 2949, 3050, 3150 which are products in the cationic Polyamine family produced by SNF FLOERGER.

These products are blended in various combinations with the two primary blends of 1) straight lanthanum or 2) in combination with the lanthanum/aluminum salt blends (e.g., 20/80, 50/50, 80/20). Blends with sodium silicate can be used to increase surface area such as 80/20, 50/50, 20/80 blend. Above blends in combination with activated silica can be used to produce lanthanum silicate.

Blends with the above (e.g., straight lanthanum chloride or lanthanum with an aluminum salt) in combination with chitosan, a naturally occurring biopolymer whereby lanthanum acetate or lanthanum citrate is utilized to put the chitosan solids into solution. Prepare lanthanum acetate by dissolving lanthanum oxide into a solution of acetic acid or conversely lanthanum oxide is dissolved into citric acid to prepare lanthanum citrate. The 5-30% stock solution of lanthanum acetate or lanthanum citrate is then used to dissolve commercial grade chitosan, derived from the deacetylation of crustacean based chitin, to produce a biocompatible copolymer for use in animal feed. Chitosan is blended with lanthanum acetate/citrate by dissolving the chitosan in a tank solution of lanthanum acetate/citrate in 5-30% concentrations to prepare the polymer solution. The polymer solution is then applied in dosage rates of 10-1000 mg/l but preferably in the range of 80-240 mg/l using a feed pump.

The present invention includes a method of treating an animal processing wastewater stream, comprising the steps of:
  a) providing a first stage that treats the wastewater stream to provide a pH range of between about 6 and 9;
  b) in the first stage, preferably adding cationic and anionic polymers to the wastewater stream;
  c) preferably adding a density modifier to the wastewater stream, the density modifier including lanthanum salt, cerium salt, or praseodymium salt or a combination thereof at a dosage rate of between about 10-1000 milligrams per liter; and
  d) separating density modified material that includes solids from the wastewater stream with one or more dissolved air flotation units.

In one or more embodiments, a second stage includes transmitting the wastewater stream to a holding tank.

In one or more embodiments, in step "a" the wastewater stream pH can be adjusted to a value of between about 4.8-5.2.

In one or more embodiments, in step "c" the density modifier can include lanthanum salt.

In one or more embodiments, in step "c" the density modifier can include cerium salt.

In one or more embodiments, in step "c" the density modifier can include praseodymium salt.

In one or more embodiments, in step "c" the dosage rate can be between about 80-240 milligrams per liter.

In one or more embodiments, the second stage includes holding the wastewater stream in the holding tank for 1-4 hours.

In one or more embodiments, wastewater stream can be held in the tank for 2-4 hours.

In one or more embodiments, the wastewater stream can be discharged from the holding tank to a chemical injection treatment that injects a density modifier.

The present invention includes a method of treating an animal processing wastewater stream, comprising the steps of:
  a) providing a first stage treatment that treats the wastewater stream to provide a pH range of between about 6 and 9;
  b) in the first stage, preferably adding cationic and anionic polymers to the wastewater stream;
  c) adding a density modifier to the wastewater stream, the density modifier including one or more of lanthanum, cerium, or praseodymium salts at a dosage rate of between about 10-1000 milligrams per liter;
  d) after step "c" separating density modified material that includes solids from the wastewater stream with a dissolved air flotation unit;
  e) holding a volume of the wastewater stream in a holding tank for a time period of between 1 and 12 hours;
  f) discharging the volume of step "e" from the holding tank;
  g) a second stage treatment including treating the volume discharged in step "f" with a second density modifier; and
  h) using a second dissolved air floatation unit to remove protein from the wastewater stream after step "g".

In one or more embodiments, the wastewater preferably flows in a continuous stream between steps "a" and "d".

In one or more embodiments, the polymers of step "b" are dosed at a rate of between 5 and 50 milligrams per liter of wastewater.

In one or more embodiments, the wastewater in step "a" has an initial biological oxygen demand (B.O.D.) of between about 1800-3000 milligrams per liter.

In one or more embodiments, the wastewater has a biological oxygen demand (B.O.D.) step "d" of between about 500-1000 milligrams per liter.

The present invention includes a method of treating an animal processing wastewater stream, comprising the steps of:
  a) providing a first stage treatment that treats the wastewater stream with a floc tube;
  b) in the first stage preferably adding cationic and anionic polymers to the wastewater stream;
  c) adding a density modifier to the wastewater stream, the density modifier including one or more of lanthanum salt, cerium salt, or praseodymium salt at a dosage rate of between about 10-1000 milligrams per liter;
  d) after step "c" separating density modified material that includes solids from the wastewater stream with a dissolved air flotation unit;
  e) holding a volume of the wastewater stream in a holding tank for a time period of between 1 and 12 hours;
  f) discharging the volume of step "e" from the holding tank;
  g) a second stage treatment including treating the volume discharged in step "f" with a second density modifier; and
  h) using a second dissolved air floatation unit to remove protein from the wastewater stream after step "g".

In one or more embodiments, the material removed can be separated into fat and protein.

In one or more embodiments, the removed material can be dissolved air flotation "float".

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
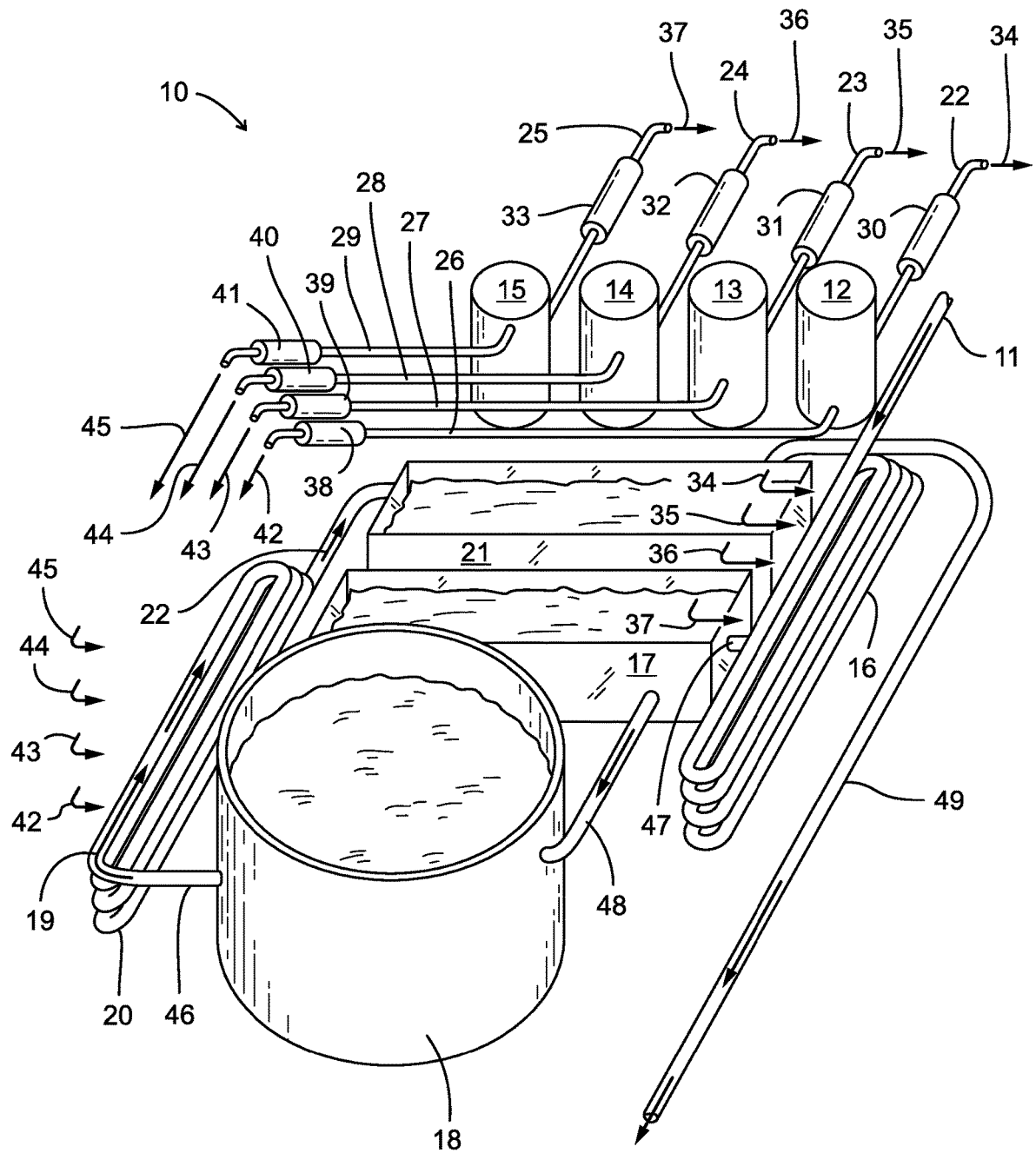
FIG. 1 is a diagram of a preferred embodiment of the apparatus of the present invention and showing the method of the present invention.

FIG. 1 shows a preferred embodiment of the apparatus of the present invention designated generally by the numeral 10. Wastewater treatment system 10 can include a first phase to replace ferric salts and to verify treatment efficacy. A second phase verifies yields on protein/fat. In FIG. 1, wastewater flow 11 from an animal processing plant can be for example about one thousand gallons per minute (1,000 gpm). The raw biological oxygen demand (B.O.D.) of this wastewater stream 11 can be between about 1800-2000 milligrams per liter (mg/l). The first stage treatment can include a first flocculation unit or floc tube 16. A second stage treatment can include a second floc tube 20 as part of a second chemical injection site. As part of the first stage of the method of the present invention, acid 12 (e.g., sulfuric acid, hydrochloric acid) is added to acidify wastewater stream 11, bringing pH to between 4.8 and 5.2, preferably about 5.0. A density modifier 13 is then added to wastewater stream 11, between 10 and 1000 milligrams per liter (mg/l), preferably between about eighty to two hundred forty (80-240) milligrams per liter. The density modifier 13 can be lanthanum, lanthanum salt, a lanthanum water mix, cerium, praseodymium salt or a combination of one or more of those. Arrows 34, 35, 36, 37 schematically illustrate flow of chemicals from vessels 12, 13, 14, 15 to first flocculation unit 16 via flow lines 22, 23, 24, 25. Each flow line 22, 23, 24, 25 can be equipped with a pump (30, 31, 32, 33 in FIG. 1) to assist in transmission of material in vessels 12, 13, 14, 15 to flocculation unit 16. A cationic polymer 14 can then be added to wastewater stream 11 between and 50 mg/l, preferably about 8 mg/l. An anionic polymer 15 is added preferably between about 5 and 50 mg/l and preferably about 8 mg/l. After the chemical treatment in first flocculation unit 16, the wastewater stream discharges from flocculation unit 16 to first dissolved air floatation unit 17 via flow line 47. In dissolved air floatation unit 17, protein floats to the top of the dissolved air flotation unit 17 where it can be skimmed off into a sludge hopper or other suitable vessel.

This treated wastewater stream exits first dissolved air flotation unit 17 via line 48 with a pH of between about 4.8 and 5.2, preferably about 5.0. This treated waste stream has a B.O.D. of between about 500-1000 mg/l. The treated wastewater discharged from first dissolved air floatation unit 17 is pumped/transmitted via line 48 to a holding tank or reactor vessel 18 (e.g., 300,000 gallons). Treated wastewater is retained in holding tank/reactor 18 for 1 to 12 hours. In reactor vessel 18, a lanthanum promoted redox reaction occurs that produces alkalinity.

The reactor 18 effluent is pumped/transmitted via flow line 46 (arrow 19) to a second phase chemical treatment which can include use of a second flocculation unit 20. The flow rate to the second flocculation unit 20 and second dissolved air flotation vessel 21 can be between 1,000 and 1,500 gallons per minute, such as about 1200 gallons per minute. In line chemical injection at second flocculation unit or floc tube 20 further reduces the B.O.D. of the wastewater stream to less than 240 mg/l. Chemical injection of sulfuric acid 12, rare earth/lanthanum mix 13, cationic polymer 14 and anionic polymer 15 are via flow lines 26, 27, 28, 29 as shown in FIG. 1. Each flow line 26, 27, 28, 29 can be supplied with a pump (38, 39, 40, 41 in FIG. 1). Arrows 42, 43, 44, 45 schematically show flow from vessels 12, 13, 14, 15 via flow lines 26, 27, 28, 29 to second flocculation unit 20.

Flow line/arrow 22 designates flow of the wastewater stream from second flocculation unit 20 to second dissolved air floatation unit 21. Protein floats to the top of the second dissolved air floatation unit 21 separating from the wastewater and is skimmed off the top of the dissolved air floatation unit into a sludge hopper or selected vessel. Recovered skimmed material is now suitable for disposal or further processing such as separating the fat and protein. After the chemical treatment with the selected rare earth density modifier of second flocculation unit 20 and second dissolved air floatation unit 21 treatment, the wastewater stream is suitable for discharge via flow line 49 into, for example, a municipal water stream and is well within required regulatory parameters for safety (e.g., BOD equals 500-1,000 mg per liter).

Figure 2:
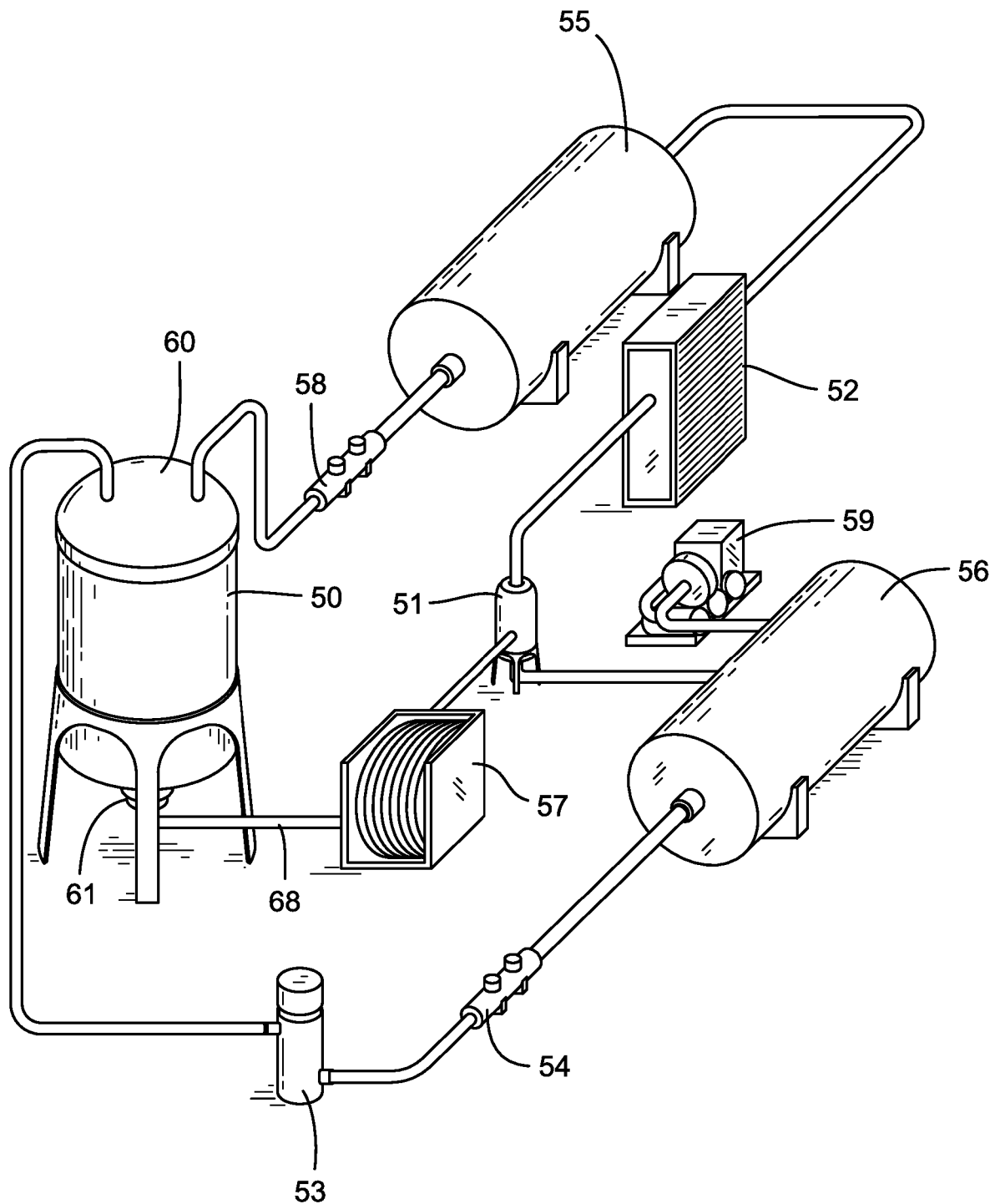
FIG. 2 is a diagram of a preferred embodiment of the apparatus of the present invention and showing the method of the present invention showing the extraction process.

FIG. 2 shows an extraction process of the apparatus and method of the present invention. Dissolved air floatation "float" from the processing plant (dissolved air flotation units) is preferably dried in a vacuum rotary dryer (and then preferably baked in an oven, if necessary) until the solid content is approximately 85%.

The process of separating the protein meal from the fat is as follows:

The dried dissolved air floatation "float" is placed into an extraction vessel 50, which preferably has a heat resistant liner bag, until the bag is approximately 90% full. The vessel 50 is preferably closed using a quick-closure lid 60. Extraction vessel 50 can have a volume of 2,100 L, a temperature of 60° C., and a pressure of 70 bar, and can hold 550 gallons.

At this time, a heated solvent from solvent storage tank 56 and via heater 53 is pumped with solvent pump 54 and compressor 59 into the extraction vessel 50 (for example, acetone, ethyl, laurate, hexane, and/or $CO_2$) at a ratio of 10% solvent to 90% dissolved air floatation "float".

Solvent storage tank 56 can have a volume of 3,000 L and ambient temperature, and can hold 800 gallons. Solvent heater 53 can be 5 KW. Solvent pump 54 can be 10 KW. Compressor 59 can be 40 KW.

The $CO_2$ is then pumped from a $CO_2$ storage 55 into the extraction vessel 50 until the desired pressure is attained. For example, for a 2100 liter (≈550 gallons) vessel, and a temperature of 60° C. (140° F.), the $CO_2$ is pumped via pump 58 into the extraction vessel 50 until a pressure of 70 Bar (1000 psi). $CO_2$ storage 55 can have a volume of 2,000 L, a temperature of 20° C., and a pressure of 60 bar, and can hold 500 gallons.

The cycle is repeated at least one more time, or multiple times.

When the desired number of cycles have been completed, the extraction vessel 50 is pressurized using the $CO_2$, and the new separated fat is "pressed" out of the extraction vessel 50 through a bottom valve 61.

The compound of fat, acetone and some $CO_2$ now flows through piping 68 to a $CO_2$ evaporator 57 (150 kilowatt for example) where the $CO_2$ gas is sent to a $CO_2$ condenser 52 (150 KW) and then returned in liquid form into the $CO_2$ storage tank 55. Evaporator 57 can be 150 KW. Condenser can be 150 KW.

Meanwhile, the fat/acetone (solvent) compound enters a separator 51 at a temperature of, for example 30° C. (70° F.) and a pressure of 1000 psi. Alternatively, the fat/acetone compound could be processed through a distiller (for example, 100 liter) at a temperature of 150° C. (302° F.) and a pressure of 1 Bar (14 psi).

The acetone is separated in the liquid/gaseous form, and leaves the separator 51 (or distiller) and enters into the solvent storage tank 56 for the next cycle. Separator 51 can have a volume of 100 L, a temperature of 30° C., and a pressure of 70 bar.

The dried protein meal bag is removed from the extraction vessel 50, the fat is removed from the separator 51 (distiller) and the next cycle begins.

Figure 3:
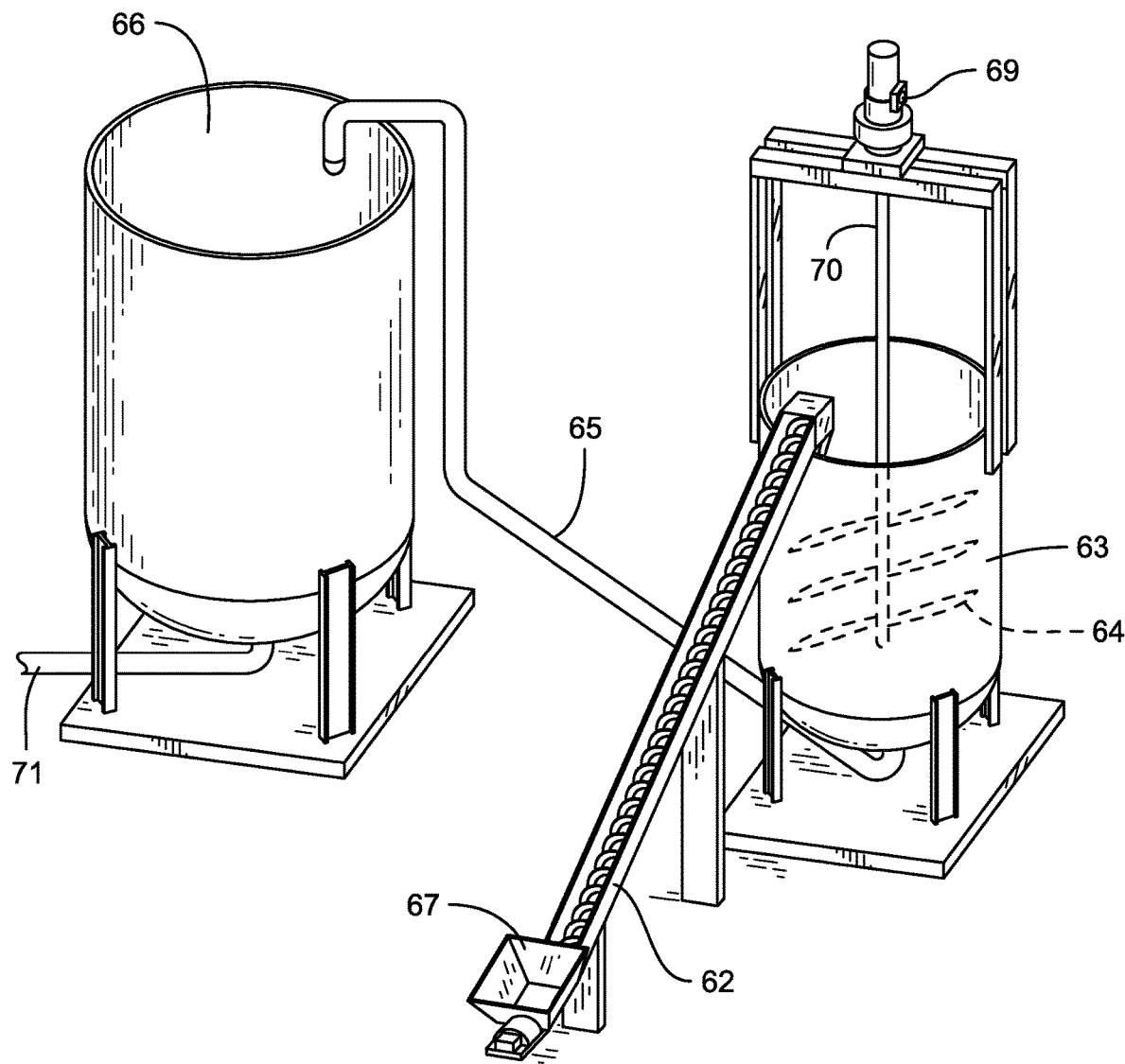
FIG. 3 is a diagram of a preferred embodiment of the apparatus of the present invention and showing a method for mixing lanthanum and water.

FIG. 3 shows a method of mixing lanthanum and water. Lanthanum is a commercially available solid crystal material. The lanthanum is placed in a hopper 67. Auger or conveyor device 62 transports the lanthanum into a mixing tank 63. Mixing tank 63 can be about 8' diameter and about 7' in height, and can hold about 2,000 gallons. Lanthanum is dissolved with water in mixing tank 63 with rotating paddles 64. Paddles 64 can be driven by motor drive 69 and drive shaft 70. The mixture of lanthanum and water is then pumped via piping 65 to holding tank 66. Holding tank/vessel 66 can be 12' diameter and 8' in height, and can hold about 7,500 gallons. Holding tank/vessel 66 can be provided with discharge pipe 71.

The following is a list of parts and materials suitable for use in the present invention:

| PARTS LIST: | |
|---|---|
| PART NUMBER | DESCRIPTION |
| 10 | treatment system |
| 11 | wastewater stream/influent pipe |
| 12 | acid/vessel |
| 13 | density modifier/vessel |
| 14 | cationic polymer/vessel |
| 15 | anionic polymer/vessel |
| 16 | flocculation unit/floc tube |

-continued

PARTS LIST:

| PART NUMBER | DESCRIPTION |
|---|---|
| 17 | first dissolved air flotation unit |
| 18 | reactor/vessel |
| 19 | arrow - reactor discharge |
| 20 | flocculation unit/floc tube |
| 21 | second dissolved air flotation unit |
| 22 | flow line/arrow |
| 23 | flow line/arrow |
| 24 | flow line/arrow |
| 25 | flow line/arrow |
| 26 | flow line/arrow |
| 27 | flow line/arrow |
| 28 | flow line/arrow |
| 29 | flow line/arrow |
| 30 | pump |
| 31 | pump |
| 32 | pump |
| 33 | pump |
| 34 | pump |
| 35 | pump |
| 36 | pump |
| 37 | pump |
| 38 | pump |
| 39 | pump |
| 40 | pump |
| 41 | pump |
| 42 | arrow |
| 43 | arrow |
| 44 | arrow |
| 45 | arrow |
| 46 | flow line |
| 47 | flow line |
| 48 | flow line |
| 49 | flow line |
| 50 | extraction vessel |
| 51 | separator |
| 52 | $CO_2$ condenser |
| 53 | solvent heater |
| 54 | solvent pump |
| 55 | $CO_2$ storage |
| 56 | solvent storage |
| 57 | $CO_2$ evaporator |
| 58 | $CO_2$ pump |
| 59 | compressor |
| 60 | quick closure lid |
| 61 | valve |
| 62 | auger/conveyor device |
| 63 | mixing tank |
| 64 | paddles |
| 65 | piping |
| 66 | holding tank |
| 67 | hopper |
| 68 | piping |
| 69 | motor drive |
| 70 | drive shaft |
| 71 | pipe |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of treating an animal processing wastewater stream which includes lipids and protein solids, the method comprising:
   a) providing a first stage that acidifies the wastewater stream, wherein the wastewater stream pH is adjusted to a value in the range of 4.8-5.2;
   b) adding a density modifier to the wastewater stream, said density modifier including lanthanum, cerium, or praseodymium salts or a combination thereof at a dosage rate in the range of 10-1000 milligrams per liter;
   c) adding a cationic polymer to the wastewater stream;
   d) adding an anionic polymer to the wastewater stream; and
   e) separating density modified floating material that includes protein solids from the wastewater stream with one or more dissolved air flotation units.

2. The method of claim 1 wherein a second stage includes transmitting the wastewater stream to a holding tank.

3. The method of claim 1 wherein in "b" the density modifier includes lanthanum salt.

4. The method of claim 1 wherein in "b" the density modifier includes cerium salt.

5. The method of claim 1 wherein in "b" the density modifier includes praseodymium salt.

6. The method of claim 1 wherein in "b" the dosage rate is between in the range of 80-240 milligrams per liter.

7. The method of claim 2 wherein the second stage includes holding the wastewater stream in the holding tank for 1-4 hours.

8. The method of claim 7 wherein the wastewater stream is held in the tank for 2-4 hours.

9. The method of claim 2 further comprising discharging the wastewater stream from the holding tank to a chemical injection treatment that injects a further density modifier.

10. The method of claim 1, wherein the material that is separated is further separated into fat and protein.

11. A method of treating an animal processing wastewater stream including lipids and protein solids, the method comprising:
   a) acidifying the wastewater stream, wherein the wastewater stream pH is adjusted to a value of in the range of 4.8-5.2;
   b) adding a first density modifier to the wastewater stream, said density modifier including one or more of lanthanum, cerium, or praseodymium salts;
   c) adding a cationic polymer to the wastewater stream;
   d) adding an anionic polymer to the wastewater stream;
   e) after "d" separating density modified floating material that includes protein solids from the wastewater stream with a dissolved air flotation unit;
   f) holding a volume of the wastewater stream in a holding tank for a time period of between 1 and 12 hours;
   g) discharging the volume of "f" from the holding tank;
   h) treating the volume discharged in g) with a second density modifier; and
   i) using a second dissolved air floatation unit to remove material that includes protein solids from the wastewater stream after "h".

12. The method of claim 11 wherein the first density modifier and the second density modifier include lanthanum salt.

13. The method of claim 11 wherein the first density modifier and the second density modifier include cerium salt.

14. The method of claim 11 wherein the first density modifier and the second density modifier include praseodymium salt.

15. The method of claim 11 wherein in "b" the dosage rate is in the range of 80-240 milligrams per liter.

16. The method of claim 11 wherein the wastewater flows in a continuous stream between "a" and "e".

17. The method of claim 11 wherein the polymers of "c" and "d" are dosed at a rate of between 5 and 50 milligrams per liter of wastewater.

18. The method of claim 11 wherein the wastewater has an initial biological oxygen demand (B.O.D.) in the range of 1800-3000 milligrams per liter.

19. The method of claim 11 the wastewater has a biological oxygen demand (B.O.D.) in the range of 500-1000 milligrams per liter after "e".

20. The method of claim 11, wherein the material that is separated is further separated into fat and protein.

21. The method of claim 20, wherein the material that is separated is dissolved air flotation "float".

22. A method of treating an animal processing wastewater stream including lipids and protein solids, the method comprising:

acidifying the wastewater stream to a pH value in the range of 4.8-5.2;

adding a density modifier to the wastewater stream, said density modifier including one or more of lanthanum, cerium, or praseodymium salts;

adding a cationic polymer to the wastewater stream;

adding an anionic polymer to the wastewater stream; and separating density modified floating material that includes protein solids from the wastewater stream.

23. The method of claim 22, wherein the material that is separated is further separated into fat and protein.

24. The method of claim 23, wherein the material that is separated is dissolved air flotation "float".

25. The method of claim 22, wherein the material that is separated is dissolved air flotation "float".

\* \* \* \* \*